US008013030B2

(12) United States Patent
Brix et al.

(10) Patent No.: US 8,013,030 B2
(45) Date of Patent: Sep. 6, 2011

(54) PROCESS FOR THE PRODUCTION OF A MOULDING COMPOSED OF FOAMED POLYTETRAFLUOROETHYLENE

(75) Inventors: Susanne Brix, Eckental (DE); Friedrich Müller, Lauf (DE); Christian Lankes, Feucht (DE); Alfred Gemmel, Kalchreuth (DE); Olivier Pinto, Lyons (FR); Mikael Abeguile, Chaponost (FR); Jérôme Alric, L'isle d'Abeau (FR); Thierry Auvray, Lancaster, PA (US); Paul Kroushl, Lancaster, PA (US)

(73) Assignee: Nexans, Paris (FR)

( * ) Notice: Subject to any disclaimer, the term of this patent is extended or adjusted under 35 U.S.C. 154(b) by 386 days.

(21) Appl. No.: 12/315,086

(22) Filed: Nov. 26, 2008

(65) Prior Publication Data

US 2009/0176901 A1 Jul. 9, 2009

(30) Foreign Application Priority Data

Nov. 29, 2007 (EP) .................................... 07291426

(51) Int. Cl.
*C08J 9/00* (2006.01)
*C08J 9/12* (2006.01)

(52) U.S. Cl. ............ 521/85; 521/94; 521/142; 521/145

(58) Field of Classification Search .................... 521/85, 521/94, 142, 145
See application file for complete search history.

(56) References Cited

U.S. PATENT DOCUMENTS 5,610,203 A * 3/1997 Buckmaster et al. ........... 521/85
5,912,278 A 6/1999 Venkataraman
6,284,810 B1 9/2001 Burnham
6,506,809 B2 * 1/2003 Hrivnak .......................... 521/85
2003/0011958 A1 1/2003 Kolmschlag
2005/0137371 A1 6/2005 Smith

FOREIGN PATENT DOCUMENTS

EP 0803878 10/1997
EP 1117103 7/2001

* cited by examiner

*Primary Examiner* — Irina S Zemel
(74) *Attorney, Agent, or Firm* — Sofer & Haroun, LLP

(57) ABSTRACT

A process for the production of a moulding composed of foamed polytetrafluoroethylene by means of an extruder, includes introducing a foaming agent, which brings about foaming, into the polytetrafluoro-ethylene, where the extruder used includes a commercially available extruder, to which a thermoplastically processable, fusible polytetrafluoroethylene is fed, the polytetrafluoroethylene is fed to the extruder together with a foaming agent which has chemical action and which has a decomposition temperature of at least 320° C., and after its discharge from the extruder, the moulding is drawn off in the direction of production without any further measures relating to the foaming procedure.

4 Claims, No Drawings

PROCESS FOR THE PRODUCTION OF A MOULDING COMPOSED OF FOAMED POLYTETRAFLUOROETHYLENE

RELATED APPLICATION

This application claims the benefit of priority from European Patent Application No. 07 291 426.0, filed on Nov. 29, 2007, the entirety of which is incorporated by reference.

FIELD OF THE INVENTION

The invention relates to a process for the production of a moulding composed of foamed polytetrafluoroethylene by means of an extruder, by introducing a foaming agent, which brings about foaming, into the polytetrafluoroethylene (DE 100 03 587 A1).

BACKGROUND

Polytetrafluoroethylene—hereinafter abbreviated to "PTFE"—is a material having excellent suitability for electrical applications. It has a low dielectric constant and a low dissipation factor. The dielectric properties can be further improved if the PTFE is foamed. Even at high temperatures, this material is stable and does not burn, and it can therefore in principle be used not only for electrical purposes but in all fields of engineering.

Known techniques for processing this material, which is therefore suitable for a wide variety of applications, are restricted to what is known as paste extrusion or ram extrusion. For this, the PTFE in powder form is charged to a paste extruder and compressed by means of a ram into an attached mould. This also applies to the PTFE foam produced according to DE 100 03 587 A1, mentioned in the introduction. To produce this, a foam-former having chemical action is admixed with the PTFE powder, and the material is foamed in the finished moulding by supplying an appropriate amount of heat, during a sintering procedure. Production of this type of moulding is therefore relatively complicated. There is moreover a restriction on the length of mouldings that can be produced in this way.

OBJECTS AND SUMMARY

An object underlying the invention is to design the process described in the introduction in such a way as to permit production of a moulding composed of foamed PTFE in a simpler manner and in any desired length.

According to the invention, this object is achieved when

- the extruder used comprises a commercially available extruder, to which a thermoplastically processable, fusible PTFE is fed,
- the PTFE is fed to the extruder together with a foaming agent which has chemical action and which has a decomposition temperature of at least 320° C., or a gas is introduced into the PTFE in the molten state in the extruder, the gas pressure in the barrel of the extruder being from 5 bar to 800 bar, and
- after its discharge from the extruder, the moulding is drawn off in the direction of production without any further measures relating to the foaming procedure.

Thermoplastically processable PTFE is commercially available which can be melted and therefore can be extruded by a conventional technique. This is PTFE modified by, for example, attachment of side chains having oxygen atoms, alongside other additives. This modification leads to a reduction in the viscosity of the PTFE. It starts to melt at a temperature of about 320° C. and at temperatures higher than that it can be processed thermoplastically, i.e. extruded using commercially available machines.

Despite the high temperatures required for the melting of PTFE, the process according to the invention can produce foamed mouldings from this type of PTFE. Surprisingly, it has been found that chemical and physical foaming is possible even for this extrudable PTFE if the correct means are used.

One of these is a foaming agent having chemical action whose decomposition starts at a temperature of 320° C. or temperatures higher than that. The chemical foaming agent decomposition temperature is typically determined by Differential Scanning Calorimetry (DSC) with a ramp of temperature of 10° C./minute, under nitrogen atmosphere.

Another possibility is use of conventional gases, such as $N_2$ or $CO_2$, for the physical foaming process if said adequate pressure is applied.

The invention therefore permits production of mouldings composed of foamed PTFE by means of commercially available extruders. After discharge of the mouldings from the extruder, no further measures relating to the foaming procedure are required, since the reactants for the foaming process are already present in the extruder or are introduced into the same, and the transition section of the extruder possesses the heat of reaction required for the foaming process, and the foaming process therefore proceeds before the material leaves the extruder. There is no requirement for any further measures relating to the foaming procedure, after discharge of the mouldings from the extruder and the cooling process that follows. A moulding thus produced can then be directly introduced to further operations, among which is by way of example winding onto a reel.

For the chemical foaming process, the foaming agent used comprises ammonium polyphosphate. This material decomposes at temperatures of from 340° C. to 375° C. The first decomposition peak of ammonium polyphospahe concerns the ammonia released gaseous product, which is detected by DSC at 340° C. Thus, the decomposition occurs after 320° C. By virtue of this high decomposition temperature and by virtue of other advantageous properties, it brings about the foaming of the fusible and extrudable PTFE. A small amount of the ammonium polyphosphate is added to the PTFE, if appropriate together with a nucleating agent.

Inventive examples of the process according to the invention are explained below.

DETAILED DESCRIPTION

The process can in principle be used for the production of any desired mouldings, as long as these can be produced by a commercially available extruder. Examples of these mouldings are rods, pipes and tapes. The process is particularly advantageously used for the production of insulation for electrical conductors and of sheathing for lines and cables, and also for the production of the dielectric material of coaxial high-frequency cables.

The materials fed to an extruder for production of a moulding composed of PTFE comprise by way of example a mixture composed of PTFE, of a chemical foaming agent and, if appropriate, of a nucleating agent. The foaming agent used comprises ammonium polyphosphate, the amount of which added to the PTFE, for 100% by weight of PTFE, is from 0.05 to 3.0% by weight. Another feed may comprise an amount of from 0.5 to 1.5% by weight of a nucleating agent, advantageously boron nitrate. After start-up, the extruder is heated until the temperature prevailing in its transition section is at least 340° C., preferably 350° C. The mixture fed to the extruder is melted in the transition section, and the foaming procedure via decomposition of the ammonium polyphosphate therefore starts. It proceeds substantially before the material leaves the extruder, which therefore discharges a moulding composed of foamed PTFE. This moulding can—as mentioned above—be directly introduced to further processing, after cooling.

In a preferred embodiment, the starting material used comprises a PTFE to which—based on 100% by weight of PTFE—0.15% by weight of ammonium polyphosphate and, if appropriate, 1.0% by weight of boron silicate as nucleating agent has been added. However, it is also possible to omit the nucleating agent in the case of chemical foaming of the PTFE.

The process according to the invention is also used for a physical foaming process, as an alternative to the chemical foaming of the PTFE. Here, an amount of from 0.5 to 1.5% by weight of a nucleating agent, preferably boron nitrate, is added to the starting material of 100% by weight of PTFE. This mixture is melted in an extruder at a temperature of at least 320° C. In the transition section of the extruder, a gas is introduced into the PTFE. Particularly suitable gases are $N_2$ and $CO_2$. The gas pressure in the barrel of the extruder is from 5 bar to 800 bar, more preferably from 600 to 700 bar. In this variant of the process, the foaming procedure again proceeds substantially in the extruder, which therefore discharges a moulding composed of foamed PTFE. Again, it can be directly introduced to further processing, after cooling.

Examples of mouldings that can be produced by the process according to the invention are—as mentioned at an earlier stage above—rods, pipes, tapes, and insulation and sheathing for lines.

Another advantageous field of application for the process according to the invention is the production of a dielectric material composed of foamed PTFE for coaxial high-frequency cables, this material in particular having excellent electrical properties. The dielectric material situated in the form of a spacer between the inner conductor and the concentric outer conductor of the coaxial cable can, for a further improvement in its electrical properties, also have been equipped with channels running in the longitudinal direction of the cable. A corresponding coaxial high-frequency cable with a dielectric material composed of unfoamed material is disclosed by way of example in EP 0 803 878 B1.

The invention claimed is:

1. Process for the production of a moulding composed of foamed polytetrafluoroethylene by means of an extruder, by introducing a foaming agent, which brings about foaming, into the polytetrafluoroethylene, wherein the extruder used comprises a commercially available extruder, to which a thermoplastically processable, fusible polytetrafluoroethylene is fed;

the polytetrafluoroethylene is fed to the extruder together with a foaming agent which has chemical action and which has a decomposition temperature of at least 320° C.; and after its discharge from the extruder, the moulding is drawn off in the direction of production without any further measures relating to the foaming procedure.

2. Process according to claim 1, wherein the foaming agent added to the polytetrafluoroethylene is in an amount of from 0.5 to 3.0% by weight of ammonium polyphosphate, based on 100% by weight of polytetrafluoroethylene.

3. Process according to claim 1, wherein the foaming agent added to the polytetrafluoroethylene is 0.15% by weight of ammonium polyphosphate, based on 100% by weight of polytetrafluoroethylene.

4. Process according to claim 1, wherein an amount of from 0.5 to 1.5% by weight of a nucleating agent, based on 100% by weight of polytetrafluoroethylene, is also added to the polytetrafluoroethylene.

* * * * *